United States Patent [19]
Baker et al.

[11] Patent Number: 4,648,466
[45] Date of Patent: Mar. 10, 1987

[54] FURROW OPENER OPERATING APPARATUS

[76] Inventors: Christopher J. Baker; Craig D. Kernohan, both of Massey University, Palmerston North, New Zealand

[21] Appl. No.: 742,809

[22] Filed: Jun. 10, 1985

[30] Foreign Application Priority Data

Jun. 13, 1984 [NL] Netherlands .............................. 208492
Jul. 18, 1984 [NL] Netherlands .............................. 208936

[51] Int. Cl.$^4$ ...................... A01B 61/04; F16D 31/02; F15B 11/00; F15B 13/00
[52] U.S. Cl. .................................. 172/260.5; 172/464; 60/416; 60/418; 91/521
[58] Field of Search ................ 172/260.5, 2, 464, 465, 172/468, 469, 491, 413; 60/414, 416, 418; 91/521

[56] References Cited

U.S. PATENT DOCUMENTS

| | | | |
|---|---|---|---|
| 3,561,541 | 2/1971 | Woelfel | 172/260.5 |
| 3,845,730 | 11/1974 | Koronka et al. | 172/413 X |
| 3,924,689 | 12/1975 | Manor | 172/260.5 X |
| 4,193,458 | 3/1980 | Meinert et al. | 172/328 |
| 4,320,589 | 3/1982 | Pelazza | 172/260.5 |
| 4,364,191 | 12/1982 | Cazes | 172/260.5 X |
| 4,506,609 | 3/1985 | Fuss et al. | 172/260.5 X |

FOREIGN PATENT DOCUMENTS 2449391 10/1980 France .............................. 172/260.5

OTHER PUBLICATIONS

John Deere Publication "Row–Crop Cultivating and Thinning Equipment," 1980, pp. 37-39, (John Deere part No. A-11-80-09).
Esposito, Anthony, *Fluid Power with Applications*, Prentice-Hall, Inc., Englewood Cliffs, NJ, 07632, 1980, pp. 435-437.

*Primary Examiner*—Richard T. Stouffer
*Assistant Examiner*—Terrence L. B. Brown
*Attorney, Agent, or Firm*—Scully, Scott, Murphy & Presser

[57] ABSTRACT

There is described a furrow opener apparatus capable of operating in a furrowing mode and a carrying mode. The apparatus consists of a double acting hydraulic cylinder having one end connected to a furrow opener drag arm and the other end connectable to a drill rig. It incorporates a pressure cushioning system consisting of at least one pressure absorber and hydraulic lines communicating through a mode valve with both the thrust and draw sides of the double acting cylinder. It further communicates through a single or double acting hydraulic valve to the hydraulic pump and reservoir of an associated prime mover such as a tractor. The mode valve is hydraulically connected to both the thrust and draw sides of the double acting cylinder. In a first mode the mode valve is hydraulically connectable to the pressure cushioning system and in a second mode hydraulically connected through a double acting hydraulic valve to the hydraulic pump and hydraulic reservoir of the prime mover. In use when the mode valve is in the first mode the pressure absorber cushions forces transmitted hydraulically through the double acting hydraulic cylinder from the openers and maintains a substantially constant pressure on both the draw and thrust sides of the double acting cylinder to thereby create a net downward force from the ram onto the furrow opener arm. In the second mode the double acting hydraulic cylinder is operable by the double acting hydraulic valve to thrust or draw its ram to respectively lower or raise the furrow opener drag arm.

18 Claims, 2 Drawing Figures

FURROW OPENER OPERATING APPARATUS

FIELD OF THE INVENTION

This invention relates in a first aspect, to a furrow opener operating apparatus. More particularly it relates to such an apparatus adapted to provide both a furrowing and a carrying function.

BACKGROUND TO THE INVENTION

It is known to use single acting cylinders and nitrogen accumulators to apply a downward, force on furrow openers. The raising and lowering of furrow openers can only be achieved by either raising the entire drill frame relative to the openers and the ground or raising a common locating bar for all the cylinders so that after reaching the limit of their extended strokes, the rams pull the furrow openers upwards as a result of the piston heads coming in contact with their respective cylinder caps. Such a system requires considerable space on the drill frame and a large capacity double acting cylinder to raise and lower the frame.

New Zealand Patent Specification No. 190,634 describes a hydraulic system for tractors using integrally mounted implements permitting the operator to control one double acting cylinder and two single acting cylinders through a single valve and lever. The cylinders involved are a single acting rock shaft cylinder, a single acting cylinder in a three point linkage, and a lift assist cylinder for lifting a frame having a trailing wheel. Such a hydraulic system acts on the frame itself and does not have any cushioning effect on the furrow openers attached to the frame. The absence of cushioning leads to a lack of depth control when individual furrow openers pass over undulations in the ground.

It is an object of this invention to alleviate at least partially these disadvantages.

SUMMARY OF THE INVENTION

According in a first aspect, the invention may be said broadly to be a circuit, which may be mounted on a drill rig, for operating a furrow opener, comprising:

a double acting hydraulic cylinder, one end of which is connectable to a furrow opener drag arm and the other end of which is connectable to a drill rig, a pressure cushioning system comprising at least one pressure absorber, and hydraulic lines communicating, through a mode selection valve with both the thrust and draw sides of said double acting hydraulic cylinder, and further communicating through a single or double acting hydraulic valve to a hydraulic pump and a hydraulic reservoir of an associated prime mover.

The mode selection valve is hydraulically connected to both the thrust side and the draw side of said double acting hydraulic cylinder; and in a first position, the mode selection valve is hydraulically connected to said pressure cushioning system, and in a second position, the mode selection valve is hydraulically connected, through the single or double acting hydraulic valve, to the hydraulic pump and the hydraulic reservoir of said associated prime mover.

In use, and when said mode selection valve is in said first position, said pressure absorber cushions forces transmitted hydraulically through said double acting hydraulic cylinder from said openers, and maintains a substantially constant pressure on both the thrust and draw sides of said double acting hydraulic cylinder, whereby there is a net downward force from the cylinder on said furrow opener drag arm. Also, when said mode selection valve is in the second position, said double acting. hydraulic cylinder is operable by said single or double acting hydraulic valve to thrust or draw its ram to lower or raise said furrow opener drag arm.

Preferably said pressure absorber is a gas accumulator, and even more preferably, a nitrogen accumulator.

Preferably the apparatus includes two or more double acting cylinders and a corresponding number of furrow openers, a thrust side hydraulic fluid manifold communicating with the thrust side of each said cylinder in parallel, and a draw side hydraulic fluid manifold communicating in parallel with the draw side of each said cylinder.

Preferably said mode selection valve is actuated to move from said second position, to said first position, when a predetermined hydraulic back pressure is reached on the thrust side of said double acting cylinder, and is actuated to move from said first position, to said second position, when a predetermined back pressure is reached in the hydraulic line feeding hydraulic fluid from an associated reservoir into said mode selection valve.

In one alternative, the actuation of the mode selection valve is done by hydraulic means; and in another alternative, the actuation of the mode selection valve is done by electrical means.

Preferably there are a pair of gas accumulators, one of which operates at a lower pressure, and the second of which operates in series with said first accumulator when a predetermined pressure is reached in the hydraulic line connected thereto.

Preferably said apparatus is mounted on or drawn by a farm tractor and said double acting and single acting hydraulic valves are tractor spool valves.

In another aspect, the invention relates to apparatus to operate drag arms mounted on a seed drilling rig. More particularly, it relates to the linkage between such drag arms and a seed drilling rig.

In the direct drilling of seeds, a furrow opener creates a shatter zone into which seeds, and optionally fertilizer, are directly deposited. The germination of seeds in the shatter zone is dependent upon a relatively constant moisture content. This can be achieved by having the furrow opener penetrate the soil to a substantially constant depth. In a flat, prepared seed bed, this can be readily done by applying a constant force on the furrow opener. However, in normal field conditions, the ground has undulations, and when a drill rig passes over the ground, compensations need to be made for these undulations. In order to achieve a substantially constant depth of penetration it is desirable that a substantially constant downward force be applied on the drill rig drag arms to which furrow openers are attached.

It is an object of this embodiment of the invention to at least partially achieve this goal.

Accordingly, the invention may be said broadly to be a furrow opener operating apparatus defined above, in combination with a seed sowing drilling rig which comprises:

a drag arm pivotally mountable at one end to a drill rig frame member, a furrow opener connected to or adjacent the other end of said drag arm, A first end of the double acting cylinder of said furrow opener operating apparatus is mounted to the drill rig frame member, and a second end of the double acting cylinder is connected to a mounting point that is spaced above said drag arm when that arm is horizontal.

The arrangement is such that, in use, when said operating apparatus is in said first mode and as an associated drill rig is moved over the ground, and said drag arm is pivoted to lower said opener into the ground the line of extension of said pivoting means intersects said drag arm at a point moving increasingly towards its furrow opener carrying end so that the net vertical moment of force on said furrow opener remains substantially constant.

Preferably said furrow opener is a ground pressure sensitive opener.

In one alternative, said opener is a rolling opener.

In another alternative, said opener is a fixed opener.

Preferably said mounting point is on a finger or equivalent projection projecting from the upper side of said drag arm.

Preferably said finger has a plurality of said mounting points, each said point being spaced vertically above said drag arm when said drag arm is horizontal.

In another embodiment, said drag arm is an upper drag arm; and there is provided a lower drag arm pivotally mountable at one end to said drill rig, and a cross link connected to the free ends of the lower and upper drag arms. These ends of the cross link are pivotally connected to the upper and lower drag arms, so that the upper and lower drag arms and the cross link, in combination with the pivotal connections of the upper and lower drag arms of the drill rig, form a parallelogram. The furrow opener is pivotally mounted in association with said cross-link.

Preferably said apparatus is mounted with the pivotal mounting points on to a seed sowing drill rig.

Preferably said seed sowing drill rig is a direct drilling rig.

In one alternative, said mounting point is on the upper of said two drag arms.

In another alternative, said mounting point is on the lower of said two drag arms.

The invention may also be said broadly to be an apparatus substantially as herein described with reference to FIG. 1 or 2.

The invention consists in the foregoing and also envisages constructions of which the following gives examples.

BRIEF DESCRIPTION OF THE DRAWINGS

The invention may be more fully understood by reference to the accompanying drawings in which.

DETAILED DESCRIPTION OF THE DRAWINGS

Figure 1:
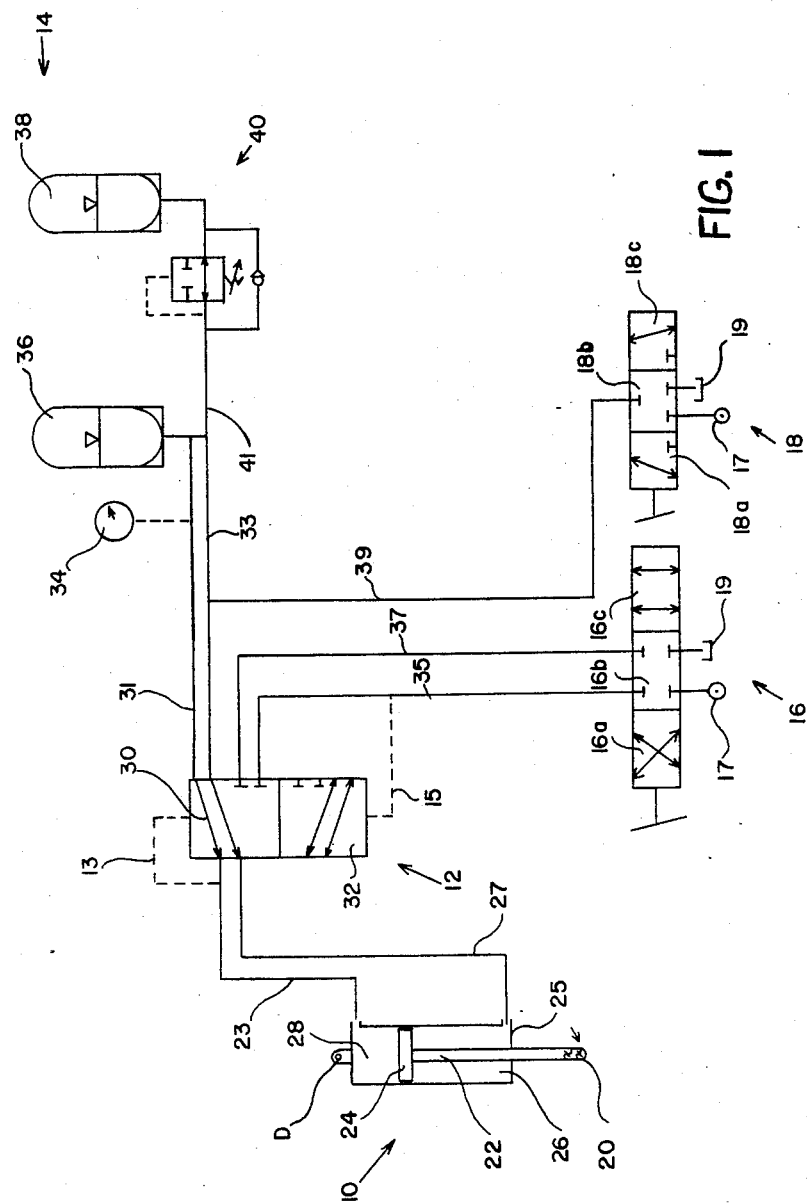
FIG. 1 is a schematic drawing of the hydraulic circuit of a preferred embodiment of a first aspect of the invention.

The main components of the apparatus of the first aspect of the invention in FIG. 1 are a double acting hydraulic cylinder 10, a sequencing and mode valve 12, a bank of nitrogen accumulators 14, a spool valve 16 for a double acting hydraulic system and a spool valve 18 for a single acting hydraulic system. Both spool valves 16 and 18 are standard equipment on farm tractors. Spool valve 18 can also be for a double acting hydraulic system.

In cylinder 10 ram 22 may be connected at mounting points 20 to a furrow drag arm. Cylinder 10 is mounted on a drill rig frame at mounting point D. Ram 22 of piston 24 projects through the end cap 25 of cylinder 10.

The piston 24 and the sealing configuration between the piston and the body of cylinder 10 allows fluid to pass freely to the draw side from the thrust side 28, but not in the reverse direction. A conventional double seal would also achieve this result, although with less sensitivity to changes in the ram position.

Thrust side 28 communicates via line 23 with mode selection valve 12. Similarly draw side 26 communicates via line 27 with mode selection valve 12. As shown in FIG. 1, mode selection, valve 12 is in a first or working mode, in which hydraulic line 23 is connected to hydraulic line 31 and hydraulic line 27 is connected to hydraulic line 33. When mode selection valve is in a second or carrying mode, hydraulic line 23 is connected to hydraulic line 37 and hydraulic line 27 is connected with hydraulic line 35 via valve section 32.

Automatic movement of mode selection valve 12 is done by detecting and actuating means illustrated by broken lines 13 and 15. Line 13 represents means for detecting the pressure in line 23 and to move valve 12 to its first position in response thereto, and 15 represents means for detecting the pressure in line 35 and to move valve 12 to its second position in response thereto. Means 13 and 15 may be electrical or hydraulic means, or spool valve 16 has three operating sections 16a, 16b and 16c.

Hydraulic pump 17 and reservoir 19, which are also components of a tractor, are operatively connected to valve 16.

The cushioning portion of the circuit is shown in the upper right-hand side of FIG. 1. Hydraulic lines 31 and 33 lead from valve 12 to a bank 14, of nitrogen accumulators 36, 38. Gauge 34 displays pressure in line 31, which controls the operation of valve 40. Nitrogen accumulator 36 is joined directly to hydraulic lines 31 and 33. Nitrogen accumulator 38 is connected to a high flow reversed sequence valve 40 in hydraulic line 41 before it intersects with line 33. Any cushioning device, such as a spring, may be employed instead of the nitrogen accumulators described.

A further hydraulic line 39 connects line 33 with one side of spool valve 18. Hydraulic pump 17 and reservoir 19 on the tractor are also connected to valve 18. In a first position of valve 18, hydraulic fluid is pumped through valve section 18a into line 39. In a second position of valve 18, valve section 18b closes line 39, and pressure is maintained in that line; and in a third position of valve 18, fluid may flow into reservoir 19 from line 39 through valve section 18c.

The two modes of operation of the circuit of FIG. 1 will now be described.

First or Working Mode

In this mode, mode valve 12 is in the position illustrated in FIG. 1. A furrow opener, which is connected by an appropriate linkage to the end 20 of ram 22, is operating in the soil. Both the thrust end 28 and the draw end 26 of cylinder 10 are equally pressurised, giving a net outward thrust on the ram shaft 22 and thereby providing a downward force on the furrow openers.

The following description will be of the operation of one cylinder in relation to one furrow opener. It is possible to have such an arrangement. However, it will be more common to have a bank of furrow openers and a corresponding number of cylinders. In such a case, a common manifold is provided in line 23 and the thrust side 28 of the cylinders 10 are connected in parallel to this manifold. Similarly, a manifold is provided in line 27 and the draw sides 26 of the cylinder 10 are connected in parallel to that manifold.

Pressure in the common cylinder/accumulator system may be adjusted by supplying additional hydraulic fluid or venting fluid through valve 18; and in particular, by moving this valve, respectively, to its first and third above-discussed positions. This pressure in the common cylinder/accumulator system is adjusted until the equilibrium is reached between the net downward force on the ram shaft thrust and the resistance of the ground to the penetration by the furrow openers. Reaching this equilibrium may be delayed by depth control wheels which may be provided on the furrow openers and which contact the surface of the ground. Once the desired or equilibrium pressure has been achieved, valve 18 is moved to the second of its above-described positions.

The pressure then remains largely unaltered by the natural rise or fall of individual furrow openers in response to ground undulations, which move each ram shaft 22 upward or downward. It is desirable that, in the hydraulic circuit, oil flows be largely unrestricted, and that there be minimal seal friction and minimal pressure drops across the cylinder and valve ports so as to achieve minimal hysteresis. Movement of shaft 22 is almost continuously back and forth while the furrow opener is operating normally in the soil.

In the embodiment illustrated, two nitrogen accumulators are employed. When the cushioning system is being supplied with hydraulic fluid, valve 40 is in the flow through position illustrated in FIG. 1. Accumulator 38 is precharged to operate at a lower pressure than accumulator 36, and accumulator 38, is protected by valve 40 against damage from higher pressures in line 41. Hence, valve 40 is adjusted to close when the pressure in line 41, which leads into accumulator 38 has reached its maximum preset operating pressure and to open when pressure in line 41 falls below that maximum. Accumulator 36 is precharged to accommodate a greater pressure than accumulator 38, and accumulator 36 does not act on lines 33 and 34 until this accumulator's minimum operating pressure is reached. The minimum operating pressure of accumulator 36 is set at a level approximately thirty percent lower than the maximum operating pressure of accumulator 38 so that the two accumulators will be acting in tandem in this range to ensure a smooth transition from one to the other. It will be seen that it is beneficial to operate with the normal pressure in line 41 in this 30% overlap range.

Carrying Mode

To raise the furrow openers from the ground, hydraulic valve 16 is moved to the position where line 35 communicates with pump 17 and line 37 communicates with reservoir 19 via valve section 16c. This creates a high pressure in line 35 which operates means 15 to move valve 12 into its second position, where lines 35 and 37 communicate with lines 27 and 23 respectively, via valve section 32. This allows the thrust side 28 of cylinder 10 to be vented to the tractor oil reservoir 19. The movement of valve 12 has isolated the accumulator system while retaining its predetermined hydraulic fluid volume and pressure. At the same time, hydraulic fluid is pumped from the tractor pump 17 through lines 35 and 27 into the draw side 26 of cylinder 10 to raise piston 24 and shaft 22 and thereby raise the furrow opener, to which it is connected, from the ground for transportation.

To lower the furrow opener when operation is to commence again, valve 16 is moved to the position where line 35 is in communication with reservoir 19 and line 37 is in communication with pump 17 via valve section 16a. Hydraulic fluid is vented from the draw side 26 of cylinder 10 via lines 27 and 35 into reservoir 19, while fluid from pump 17 flows along lines 37 and 23 into the thrust end 28 of cylinder 10 until the furrow opener is in contact with the soil surface. In one preferred embodiment this happens at approximately 40% extension of ram 22.

When a sufficient hydraulic pressure builds up in thrust side 28 of hydraulic cylinder 10, this pressure is transmitted to line 23 and actuates means 13 to move valve 12 into the position, illustrated in FIG. 1. This automatic actuation of valve 12 prevents an overpressurising the furrow opener. Valve 16 is isolated from and cylinder 10, preventing any damage from leaving the valve in the position where line 37 is in communication with pump 17 via valve section 16a.

It will be seen that a bank of double acting cylinders and appropriate valving allows a single set of cylinders to perform the following functions:
  a. to provide controlled downward thrust on furrow openers,
  b. to raise the openers in a controlled manner to carry the openers over the ground, and
  c. to lower the furrow openers in a controlled manner for use again.

The systems allows the operator to use principally the normal spool valves on a tractor with which the operator will normally be familiar. As no new skills are required the danger of improper operation is correspondingly reduced.

Other variations of the apparatus described herein in relation to FIG. 1 will be apparent to those skilled in the art.

Figure 2:
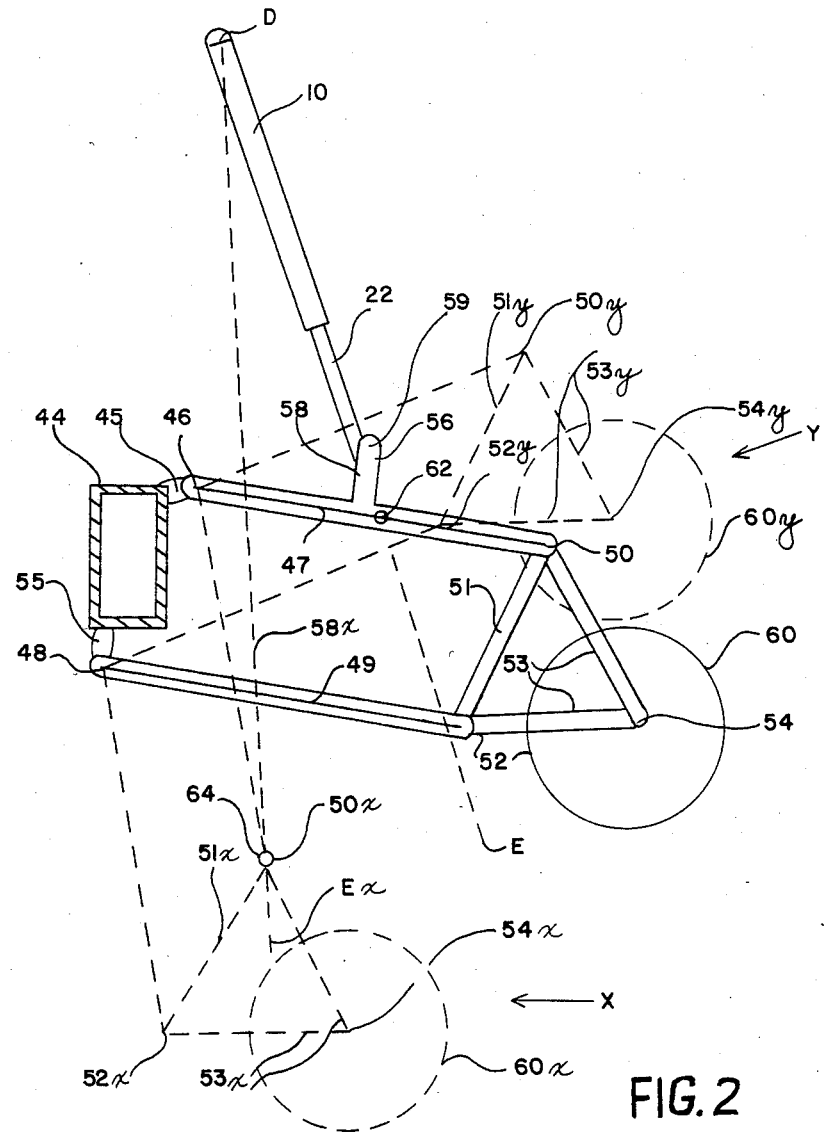
FIG. 2 is a schematic diagram of a fragmentary side elevational view of a preferred embodiment of the second aspect of the invention.

The components illustrated in FIG. 2 are those which need to be illustrated for a basic understanding of the second aspect of the invention. FIG. 2 illustrates three positions of operation of the drag arms in a seed sowing drill rig. A lowered position is illustrated by the general arrow X. A raised position is illustrated by a general arrow Y.

A drill rig draught beam 44 has a pair of mounting brackets 45 on its rear face and another pair of mounting brackets 55 on its bottom face. A drag arm 47 is pivotally mounted to bracket 45 at pivot point 46. A first end of cross-link member 51 is pivotally mounted at pivot point 50 to the distal end of arm 47. An finger 56 is mounted on the upper face of arm 47. A first end 48 of the lower drag arm 49 is pivotally mounted on brackets 55. A second end of cross-link 51 is pivotaly mounted, at point 52 to the distal end of lower pivot arm 49. The furrow opener 60 is a disc opener.

Hydraulic cylinder 10 is mounted on a drill rig frame member which is not illustrated. Preferably cylinder 10 is the double acting cylinder of FIG. 1. The free end of extensible ram 22 of hydraulic cylinder 10 is mounted on finger 56 at point 58. Alternatively, ram 22 can be mounted on finger 56 at point 59. Preferably, alternative mounting points are also provided on the free end of ram 22. Point 62 on drag arm 47 is the point on that arm that intersects the line of force of operation of ram 22 (line D-E) when furrow opener 60 is in the neutral position, shown in full lines, in FIG. 1. Point 64 is the point on arm 47 that intersects the line of force of ramp 2 (line D-Ex) when the drag arms are lowered to the lower position illustrated in broken lines in FIG. 1.

In operation, the drag arm and furrow opener assembly and hydraulic ram are mounted on a drill rig which is towed behind a prime mover, usually a farm tractor. As the drill rig is pulled in a horizontal direction (to the left in FIG. 2) the normal operating position is illustrated in full lines in FIG. 2. A predetermined hydraulic pressure is applied (for example by the circuit of FIG. 1) to hydraulic ram 22 to force the drag arms 47 and 49 and hence the furrow opener 60 into the ground at a predetermined ground pressure and thus depth. Part of the net vertical moment of force on opener 60 arises as a result of the force applied by the hydraulic ram 22 and is countered by the vertical component of the draught force if the arms 47 and 49 operate with the right-hand end below the horizontal, as is normal.

As opener 60 passes over a depression it moves to a position between that shown by the arrow X and the central position shown in FIG. 2. The point of intersection between drag arm 47 and the force line D-Ex of ram 22 moves towards the proximal end of upper drag arm 47 increasing the mechanical advantage of the force being applied by the ram 22 to opener 60. As the drag arms 47 and 49 are pivoted downwardly and forwardly, the negative (upward) vertical component of draught force increases, but this is compensated by the fact that the vertical component of the force applied to arm 47 by ram 22 also increases, so that the net vertical moment of the force on the furrow opener remains substantially constant.

Similarly as the furrow opener 60 is pivoted to the position Y by undulations in the ground passing beneath the rig, the vertical component of the force applied to arm 47 by the ram 22 decreases, and the vertical component of the draught force increases, with the net vertical force on arm 47 remaining substantially unchanged. This effect is achieved so long as the end of ram 22 is mounted on arm 56 at either of the mounting points 58 or 59 so that the point of intersection of the line of force of ram 22 and arm 47 moves along arm 47 as that arm itself is pivoted.

In the embodiment illustrated in FIG. 2, drag arms 47 and 49 and cross-link 51, together with an imaginary line between points 46 and 48, form a parallelogram. It will be appreciated that a single drag arm 47 could equally be employed, with furrow opener 60 mounted on arm 47 at point 50. When parallel arms are used, as in the embodiment of FIG. 2, the position of point 54 has no bearing on the mechanical advantage which can be achieved. When only a single arm is employed then a change in the position of point 54 will change the mechanical advantage that can be obtained.

In an alternative embodiment furrow opener 60 can be a chisel type or other fixed opener.

Similarly, the member applying the downward force on drag arm 47 does not have to be an hydraulic ram, and it can be a pair of telescoping arms with a spring forcing the two telescoping arms apart from one another. Where such a spring is used, because any change in the length of the spring changes its downward force, the telescoping arms are connected to finger 56 at the higher pivoting point 59 so that the compensatory moment is increased to offset changes in spring force.

Other permutations and the combinations within the scope of the invention defined herein will be apparent to those skilled in the art.

What is claimed is:

1. Apparatus for operating a ground engaging implement, the implement being mounted on a drag arm that is pivotally connected to a support means, the operating apparatus comprising:
   double acting hydraulic cylinder means having thrust and draw sides and first and second ends, the first end being adapted to connect the cylinder means to the drag arm, the second end being adapted to connect the cylinder means to the support means; and
   a hydraulic circuit, including
   (i) a first section including a source of pressurized fluid and fluid reservoir,
   (ii) a second section including pressure absorption means,
   (iii) a mode selection valve having a first position to connect the cylinder means hydraulically to the first section and to disconnect the cylinder means hydraulically from the second section, and a second position to connect the cylinder means hydraulically to the second section and to disconnect the cylinder means hydraulically from the first section,
   (iv) conducting means connecting the mode selection valve to the first section to conduct hydraulic fluid therebetween, connecting the mode selection valve to the second section to conduct hydraulic fluid therebetween, and connecting the mode selection valve to the thrust and draw sides of the cylinder means to conduct fluid between the mode selection valve and the thrust and draw sides,
   (v) the first section further including first and second control valves,
   the first control valve having a first position to conduct fluid, when the mode selection valve is in its first position, from the source of pressurized fluid to the thrust side of the cylinder mewns and from the draw side of the cylinder means to the reservoir to extend the cylinder means,
   the first control valve further having a second position to conduct fluid, when the mode selection valve is in its first position, from the source of pressurized fluid to the draw side of the cylinder means and from the thrust side of the cylinder means to the reservoir to retract the cylinder means,
   when the mode selection valve is in its second position, the thrust and draw sides of the cylinder means are connected to the second section, and said second section is adpated to dampen forces transmitted through the cylinder means from the ground engaging implement, and maintains a substantially constant pressure on the thrust and draw sides of the cylinder means, and the cylinder means is adapted to apply a substantially constant net force on the ground engaging implement,
   the second control valve having a first position to conduct fluid from the source of pressurized fluid to the second section to increase the pressure therein, and having a second position to vent hydraulic fluid to the reservoir from the second section to decrease the pressure therein.

2. Apparatus according to claim 1, wherein the pressure absorption means includes a gas accumulator.

3. Apparatus according to claim 1, for use with a plurality of ground engaging implements mounted on a plurality of drag arms, and wherein:
the hydraulic cylinder means includes a multitude of double acting hydraulic cylinders, each of the cylinders having thrust and draw sides; and
the conducting means includes
(i) a thrust side manifold to conduct hydraulic fluid in parallel between the mode selection valve and the thrust sides of the cylinders, and
(ii) a draw side manifold to conduct hydraulic fluid in parallel between the mode selection valve and the draw sides of the cylinders.

4. Apparatus according to claim 1, wherein the hydraulic circuit further includes:
first actuation means to sense the pressure of fluid on the thrust side of the hydraulic cylinder means, and to move the mode selection valve from its second position to its first position when the pressure of fluid on the thrust side of the hydraulic cylinder means rises above a preset value; and
second actuation means to sense the pressure of fluid connected to the mode selection valve from the source of pressurized fluid, and to move the mode selection valve from its first position to its second position when the pressure of the fluid conducted to the mode selection valve from the source of pressurized fluid rises above a predetermined valve.

5. Apparatus according to claim 4, wherein each of the first and second actuation means comprises hydraulically operated actuator means.

6. Apparatus according to claim 4, wherein each of the first and second actuation means comprises electrically operated actuator means.

7. Apparatus according to claim 2, wherein the gas accumulator is a nitrogen gas accumulator.

8. Apparatus according to claim 1, wherein:
the conducting means includes first means connecting the mode selection valve to the second section to conduct fluid therebetween; and
the second section includes
(i) a first accumulator connected to the first means to receive fluid therefrom when the fluid pressure in said first means rises above a first preset level, and
(ii) a second accumulator connected to the first means to receive fluid therefrom when the fluid pressure in said first means rises above a second preset level, greater than the first preset level.

9. Apparatus according to claim 1, in combination with a tractor having a multitude of hydraulic valves, and wherein:
the mode selection valve adapted to be a first valve of the tractor,
the first and second control valves respectively are adapted to be second and third valves of the tractor.

10. Apparatus according to claim 1, wherein, when the mode selection valve moves from its first position to its second position, the pressure on both the thrust and draw sides of the hydraulic cylinder means immediately becomes equal to the pressure in the second section of the hydraulic circuit.

11. Apparatus according to claim 1, wherein the conducting means connects the second section to the first section independent of the mode selection valve, the second control valve is operable to connect the second section to the source of pressurized fluid and to the reservoir to vary the pressure in the second section independent of the position of the mode selection valve.

12. Apparatus for engaging and working the ground, for use with a support means, comprising:
at least a first drag arm having first and second ends, the first end of the drag arm being adapted for pivotal connection to the support means for movement to and from a horizontal position;
a ground engaging implement;
means connecting the implement to the second end of the drag arm;
a projection extending outward from the drag arm;
a double acting hydraulic cylinder having thrust and draw sides and first and second ends, the first end of the hydraulic cylinder being adapted for connection to the support means, the second end of the hydraulic cylinder being pivotally connected to the projection for pivotal movement about a first point spaced above the drag arm when said drag arm is in the horizontal position;
a hydraulic circuit, including
(i) a first section including a source of pressurized fluid and a fluid reservoir,
(ii) a second section including pressure absorption means,
(iii) a mode selection valve having a first position to connect the hydraulic cylinder hydraulically to the first section and to disconnect the hydraulic cylinder hydraulically from the second section, and a second position to connect the hydraulic cylinder hydraulically to the second section and to disconnect the cylinder hydraulically from the first section,
(iv) conducting means connecting the mode selection valve to the first section to conduct hydraulic fluid therebetween, connecting the mode selection valve to the second section to conduct hydraulic fluid therebetween, and connecting the mode selection valve to the thrust and draw sides of the cylinder to conduct fluid between the mode selection valve and the thrust and draw sides,
(v) the first section further including the first and second control valves,
the first control valve having a first position to conduct fluid, when the mode selection valve is in its first position, from the source of pressurized fluid to the thust side of the cylinder and from the draw side of the cylinder to the reservoir to extend the cylinder and lower the ground working implement into the ground,
the first control valve further having a second position to conduct fluid, when the mode selection valve is in its first position, from the source of hydraulic fluid to the draw side of the cylinder and from the thrust side of the cylinder to the reservoir to retract the cylinder and raise the ground working implement out of the ground,
when the mode selection valve is in its second position, the thrust and draw sides of the cylinder are connected to the second section, and said second section dampens forces transmitted through the hydraulic cylinder from the ground working implement, and maintains a substantially constant pressure on the thrust and draw sides of the cylinder, and the cylinder applies a substantially constant net force on the ground working implement; the second control valve having a first position to conduct fluid from the source of pressurized fluid to the second section to increase the pressure therein, and having a second position to vent hydraulic fluid to the reservoir from the second section to decrease the pressure therein.

13. Apparatus according to claim 12, wherein the ground engaging implement is a pressure sensitive furrow opener.

14. Apparatus according to claim 12, wherein the ground engaging implement a rolling furrow opener.

15. Apparatus according to claim 12, wherein the ground engaging implement is a fixed furrow opener.

16. Apparatus according to claim 12, wherein the projection extends outward from an upper side of the drag arm.

17. Apparatus according to claim 16, wherein:
the projection is adapted for connection to the hydraulic cylinder at each of a plurality of mounting points, each of the mounting points being spaced above the drag arm when the drag arm is in its horizontal position.

18. Apparatus according to claim 12, further including:
a second drag arm having first and second ends, the first end of the second drag arm being adapted for pivotal connection to the support means;
a cross link pivotally connected to the second ends of the first and second drag arms;
the support frame, the first and second drag arms, and the cross link being adapted to form a parallelogram with the support means; and
the ground engaging implement being connected to the cross link for pivotal movement therewith relative to the first and second drag arms.

* * * * *

UNITED STATES PATENT AND TRADEMARK OFFICE
CERTIFICATE OF CORRECTION

PATENT NO. : 4,648,466
DATED : March 10, 1987
INVENTOR(S) : Christopher J. Baker, et al.

It is certified that error appears in the above-identified patent and that said Letters Patent is hereby corrected as shown below:

Claim 1, Column 8, line 43: "mewns" should read --means--

Claim 1, Column 8, line 56: "adpated" should read --adapted--

Claim 4, Column 9, line 25: "connected" should read --conducted--

Signed and Sealed this

Fifteenth Day of September, 1987

Attest:

DONALD J. QUIGG

*Attesting Officer*  *Commissioner of Patents and Trademarks*